W. Croasdale.
Feed Trough.
N° 18,275.  Patented Sept. 29, 1857.
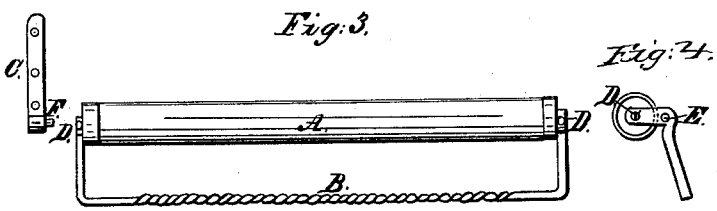
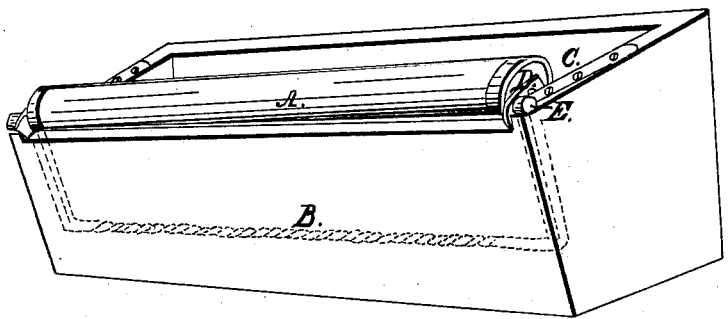
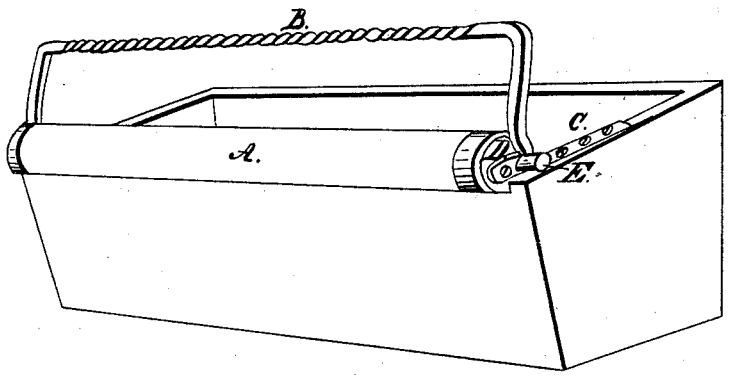

UNITED STATES PATENT OFFICE.

WILLIAM CROASDALE, OF HARTSVILLE, PENNSYLVANIA.

CRIB OF HORSE-STABLES.

Specification of Letters Patent No. 18,275, dated September 29, 1857.

*To all whom it may concern:*

Be it known that I, WILLIAM CROASDALE, of Hartsville, in the county of Bucks and State of Pennsylvania, have invented a new and useful Machine to Prevent Horses, Mules, &c., from Crib-Biting and Wind-Sucking; and I do hereby declare that the following is a full, clear, and exact description of the construction and operation of the same, reference being had to the annexed drawings, making a part of this specification, in which—

Figure 1, is a perspective view of the machine, with the striker depressed, and resting within the crib. Fig. 2, a view of the machine with the striker elevated, showing its position at the moment of striking the animal. Fig. 3, a longitudinal view of the roller with striker attached. Fig. 4, is an end view of roller, and striker. Fig. 5, a section of the hinge, which attaches the striker to the crib.

Like letters refer to like parts.

A, the roller. B the striker. C the strap of hinge. D screw passing through the striker, and into the end of the roller, serving as the axle thereof.

E is the eye in the striker, at the above named angle of one hundred and twenty degrees, and into which the pin of the hinge is inserted. F the pin of the hinge, serving as the axle, upon which the striker turns.

To enable others skilled in the arts, to make and use my invention, I will proceed to describe its construction and operation.

It consists of a roller (A) attached to the striker (B) by means of the screw or axle (D) upon which it turns when seized by the animal. Also a striker (B) attached to the roller (A) as above described, and also to the strap (C) by the pin (F) upon which it freely turns. The strap (C) is firmly screwed to the crib. The striker (B) at the point of connection with the pin (F) is shaped at an angle of about one hundred and twenty degrees.

The operation of the machine is as follows: The roller (A) and striker (B) being in the position as shown in Fig. 1, the roller (A) is seized by the animal, which causes it to turn upon the screw or axle (D) and striker (B) upon the pin or axle (F), and throws up the striker (B), the upper portion of which striking the animal, causes him to relax his hold; the weight of the upper part of the striker (B) being sufficient to cause it to fall back into the crib.

What I claim as my invention, and desire to secure by Letters Patent is—

The revolving roller (A) in connection with the striker (B) as described in the accompanying drawings and specification.

WILLIAM CROASDALE.

Witnesses:
   JOSEPH BARNESLEY,
   L. H. BARNESLEY.